US009116944B1

(12) United States Patent
Emigh (10) Patent No.: US 9,116,944 B1
(45) Date of Patent: Aug. 25, 2015

(54) PROMOTION SELECTION VIA INTEREST DETECTION

(76) Inventor: Aaron T. Emigh, Incline Village, NV (US)

( * ) Notice: Subject to any disclaimer, the term of this patent is extended or adjusted under 35 U.S.C. 154(b) by 2548 days.

(21) Appl. No.: 11/582,193

(22) Filed: Oct. 16, 2006

Related U.S. Application Data (60) Provisional application No. 60/727,040, filed on Oct. 15, 2005, provisional application No. 60/727,039, filed on Oct. 15, 2005, provisional application No. 60/837,235, filed on Aug. 11, 2006.

(51) Int. Cl.
*G06F 17/30* (2006.01)
*H04N 21/858* (2011.01)
*G06F 3/0482* (2013.01)

(52) U.S. Cl.
CPC ........ *G06F 17/30386* (2013.01); *G06F 3/0482* (2013.01); *G06F 17/30902* (2013.01)

(58) Field of Classification Search
CPC .......... G06Q 30/0241; G06Q 30/0251; G06Q 17/3089; H04M 1/72561
USPC ............................................ 705/14; 709/217
See application file for complete search history.

(56) References Cited

U.S. PATENT DOCUMENTS

| | | | |
|---|---|---|---|
| 6,100,890 A | | 8/2000 | Bates et al. |
| 6,134,532 A * | | 10/2000 | Lazarus et al. ............. 705/14.25 |
| 6,308,202 B1 * | | 10/2001 | Cohn et al. ................... 709/217 |
| 6,401,118 B1 * | | 6/2002 | Thomas ......................... 709/224 |
| 6,925,442 B1 * | | 8/2005 | Shapira et al. ................ 705/7.33 |
| 7,076,443 B1 | | 7/2006 | Emens et al. |
| 7,310,612 B2 | | 12/2007 | McQueen et al. |
| 2002/0062382 A1 * | | 5/2002 | Rhoads et al. ................. 709/228 |
| 2002/0138582 A1 * | | 9/2002 | Chandra et al. ............... 709/206 |
| 2004/0083294 A1 | | 4/2004 | Lewis |
| 2005/0165904 A1 * | | 7/2005 | Mooney ......................... 709/217 |
| 2005/0289468 A1 | | 12/2005 | Kahn et al. |

OTHER PUBLICATIONS

Jesse Ruderman et all, "CSS on a:visited can load an image and/or reveal if visitor been to a site." Mozilla bug #57531, Oct. 19, 2000—present including comments both before and after the priority date; entire bug report page reproduced here, including comments made after the priority date, for the sake of completeness.
Andrew Clover, "CSS Visited Pages Disclosure." Posted to Bugtraq mailing list on Feb. 20, 2002.
David Baron et al, ":visited support allows queries into global history." Mozilla bug #14777, May 28, 2002—present including comments both before and after the priority date; entire bug report page reproduced here, including comments made after the priority date, for the sake of completeness.
David Baron, "Visited link exploit, test #1." Attachment to Mozilla bug #14777, Jun. 11, 2002.

(Continued)

*Primary Examiner* — Wutchung Chu
*Assistant Examiner* — Jason Harley (57) ABSTRACT

Techniques for selecting content may include determining that a URL was historically visited, determining an interest associated with the URL, and selecting content associated with the interest. Selected illustrative applications for displaying relevant content, subscribing to relevant content sources, displaying relevant advertisements, and offering and/or applying relevant promotions are disclosed.

19 Claims, 4 Drawing Sheets

(56) References Cited

OTHER PUBLICATIONS

Markus Jakobsson et al, "Phishing for Clues: Inferring Context Using Cascading Style Sheets and Browser History." Published at https://www.indiana.edu/~phishing/browser-recon/, date unknown (believed based on work done in Aug. 2005).

Markus Jakobsson et al, source code to "Phishing for Clues: Inferring Context Using Cascading Style Sheets and Browser History." Published at https://www.indiana.edu/~phishing/browser-recon/, date unknown (believed based on work done in Aug. 2005).

* cited by examiner

PROMOTION SELECTION VIA INTEREST DETECTION

CROSS REFERENCE TO RELATED APPLICATIONS

This application claims priority to U.S. Provisional Patent Application No. 60/727,040 entitled Intelligent Enrollment Via Historical Interest Indication, filed Oct. 15, 2005, which is incorporated herein by reference for all purposes.

This application claims priority to U.S. Provisional Patent Application No. 60/727,039 entitled Intelligent Content Selection Via Historical Interest Indication, filed Oct. 15, 2005, which is incorporated herein by reference for all purposes.

This application claims priority to U.S. Provisional Patent Application No. 60/837,235 entitled Information Processing, filed Aug. 11, 2006, which is incorporated herein by reference for all purposes.

FIELD OF THE INVENTION

The present invention relates generally to the area of electronic content. More specifically, techniques for intelligent content selection and subscription based on historical interest indicators are disclosed, including illustrative applications to feed reading, content presentation and discovery, promotions, and advertisements.

BACKGROUND OF THE INVENTION

A wide variety of information is available electronically. Similarly, many types of products, relevant to audiences with specific interests, are advertised electronically via the internet. Numerous promotions are similarly offered via the internet, including discounts, affiliate programs, and loyalty programs such as airline frequent flyer programs.

Much of the information available electronically is available via subscription. Examples of such information include news, web logs ("blogs"), corporate information, and product information, for example information published using a content syndication format such as RSS and Atom. Currently, subscription to such content requires a user to select sources and/or feeds of content that may be of interest. Such selection can be cumbersome and time-consuming, and content sources of interest may be omitted.

A user's historical browsing can reveal that user's interests. Current ways to present and subscribe to content does not have general access to a user's history, and generally cannot personalize based on historical information. Accordingly, it would be useful to have more automated detection and presentation of content, content sources, advertisements and promotions likely to be relevant to a user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
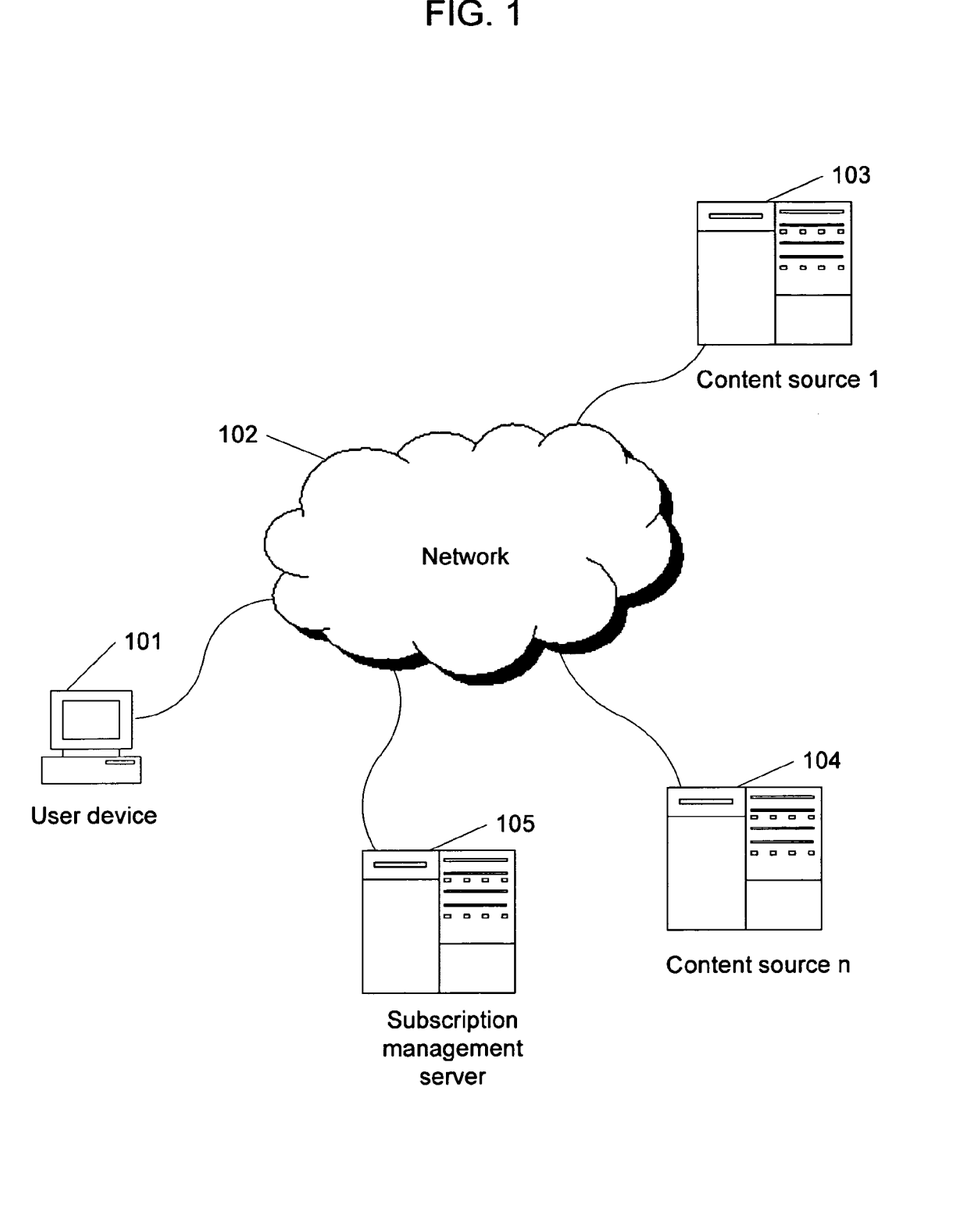
FIG. 1 is a diagram of a system for content selection and/or enrollment, according to some embodiments.

FIG. 1 is a diagram of a system for content selection and/or enrollment, according to some embodiments. Enrollment refers herein to subscription to one or more sources of content, for example syndicated content such as content distributed using a content syndication format such as RSS or Atom. In this example, a user device 101 is connected to a network 102. A user device 101 may be any device capable of receiving content, including a personal computer, PDA, or cell phone.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet. An example of the use of such a network is for a user device 101 and an optional subscription management server 105 to be connected via a local area network such as an enterprise network, and for the local area network to be connected to content sources 103, 104 via a public network such as the internet.

In some embodiments, one or more content sources such as content source 1 103 and content source n 104 are connected to the network 102. A content source may provide content, such as syndicated content or advertisement(s), via the network 102. In some embodiments, such content may be provided to a user device 101. In some embodiments, such content may be provided to a subscription management server 105. In some embodiments (not shown), such content may be provided to a content aggregator such as an online content reader.

In some embodiments, a content source 103, 104 may provide one or more specific content items such as advertisements. In some embodiments, a content source 103, 104 may provide syndicated content such as advertisements from multiple sources. In some embodiments, a content source 103, 104 may provide a single feed of content. In some embodiments, a content source 103, 104 may provide a plurality of feeds of content. A feed refers herein to any collection of content receivable to enrolled recipients (e.g. via subscription) available from a content source. Examples of feeds include content available from an address such as a URL via RSS or Atom.

In some embodiments, a subscription management server 105 may be connected to the network 102. The subscription management server 105 may enroll user device 101, and/or a user associated with user device 101, in one or more content feeds. In some embodiments, the subscription management server 105 may be associated with a content reader such as an RSS and/or Atom reader.

In some embodiments, techniques for content selection and/or enrollment may be run on a user device 101 and/or a subscription management server 105. Details of such intelligent content selection and enrollment are discussed in conjunction with the remaining figures.

Figure 2:
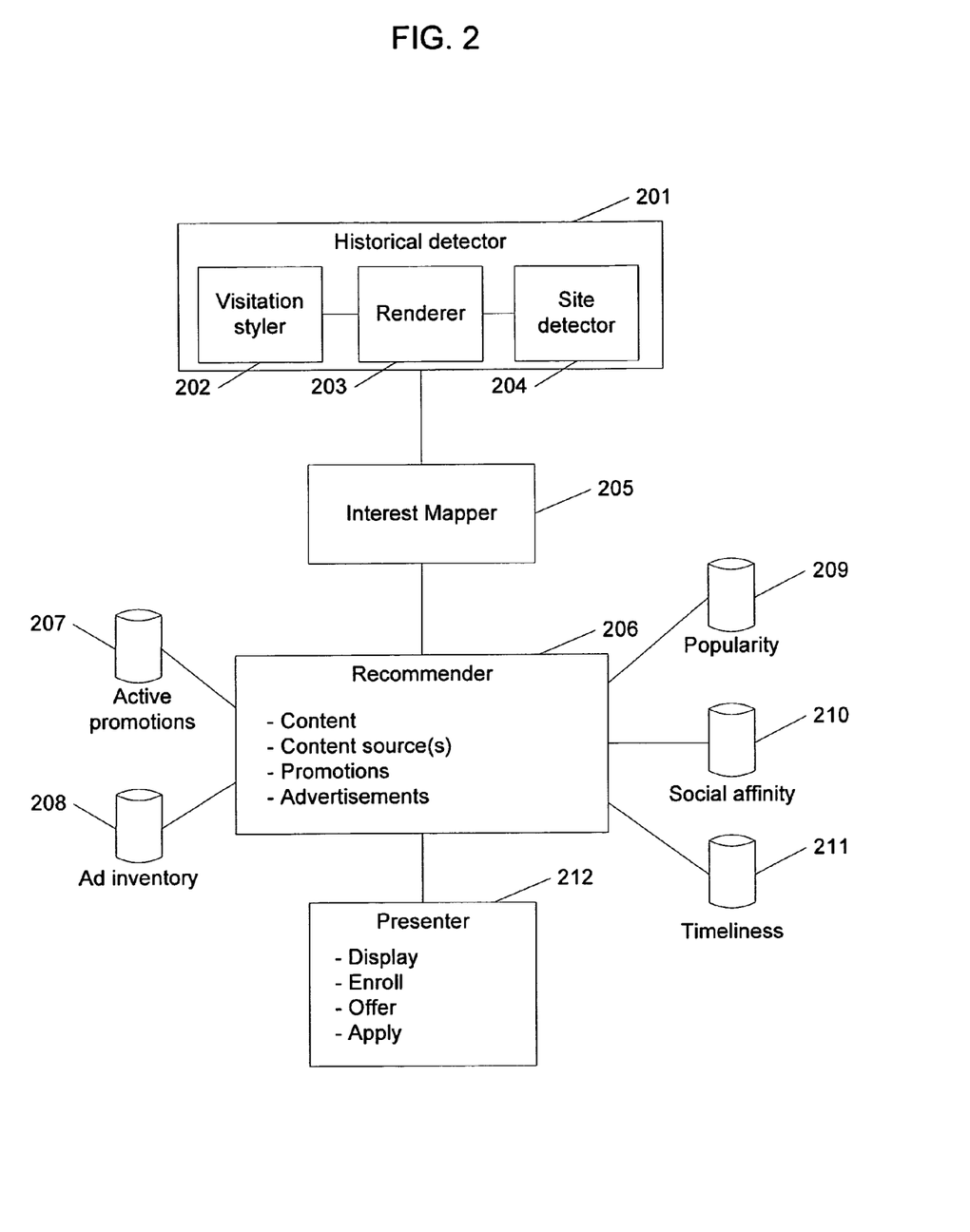
FIG. 2 is a diagram of a system for selecting and/or enrolling for content, according to some embodiments.

FIG. 2 is a diagram of a system for selecting and/or enrolling for content, according to some embodiments. In this example, a historical detector 201 detects one or more historical interests. In some embodiments, a historical detector 201 may include a visitation styler 202, a renderer 203 (which may in some embodiments be performed externally, for example by a document browser such as a web browser), and a site detector 204. Further details of the operation of a historical detector 201 are discussed in conjunction with FIG. 4.

A visitation styler 202 may provide associate one or more sites with a distinguishable quality that indicates whether each site (or a member of a set of sites) has been historically visited, for example by including a link to a site and associating the link with a "visited" pseudoclass that provides a distinguishable quality such as invocation of an image load, text size, text color, text position, etc. A site refers herein to a URL, which may include a domain name.

A renderer 203 may render links associated with one or more sites in a manner to cause a distinguishable quality associated with the link to become assigned to the link. In some embodiments, a renderer 203 may be a document browser such as a web browser, which may invoke a "visited" pseudoclass associated with links referring to sites that have historically been visited.

A site detector 204 may detect links that have been visited, for example by determining whether a link has been endowed with a distinguishable quality associated with a visited pseudoclass. In some embodiments, a site detector 204 may be associated with Javascript. In some embodiments, a site detector 204 may be on a server, which may for example detect image requests.

In some embodiments, an interest mapper 205 may map one or more visited sites onto one or more interests. An example of an interest is a keyword. Another example of an interest is an identifier that is used to identify an interest. In some embodiments, an interest mapper 205 may be the identity mapper, i.e. may simply pass through one or more visited sites.

A recommender 206 may determine one or more items relevant to one or more historical interests. One example of an item relevant to a historical interest is content, such as a story, image, video, web page, etc. Another example of an item relevant to a historical interest is a content source, such as a source of a feed such as an RSS or Atom feed. Another example of an item relevant to a historical interest is a promotion, such as a discount, an affiliate program, a loyalty program such as airline frequent flyer miles, etc. Another example of an item relevant to a historical interest is an advertisement.

A recommender 206 may make use of various data in the course of determining one or more items relevant to one or more historical interests. In determining that a promotion is relevant, a recommender 206 may make use of a set of active promotions 207, which for example may be associated respectively with one or more interests. In determining that an advertisement is relevant, a recommender 5xz06 may make use of an advertising inventory 208, which may contain one or more advertisements that are respectively associated with one or more interests, such as keywords. In determining one or more items of content or content sources that are relevant, a recommender 206 may make use of data associated with the content or content source(s), for example popularity 209, social affinity of the user for whom a recommendation is being made 210, and/or the timeliness of content 211, such as a publication date associated with content.

A presenter 212 may present one or more items associated with one or more historical interests. An example of presenting an item is to display the item, such as a story, web page or advertisement, for example by providing it to be rendered by a document browser such as a web browser. Another example of presenting an item is to enroll a user in the item. An example of enrolling a user in an item is to subscribe the user to a content source, for example by updating a set of feed subscriptions to include the content source. Another example of presenting an item is to offer or apply a promotion such as a discount, affiliate program, or loyalty program such as a frequent flyer miles program.

Figure 3:
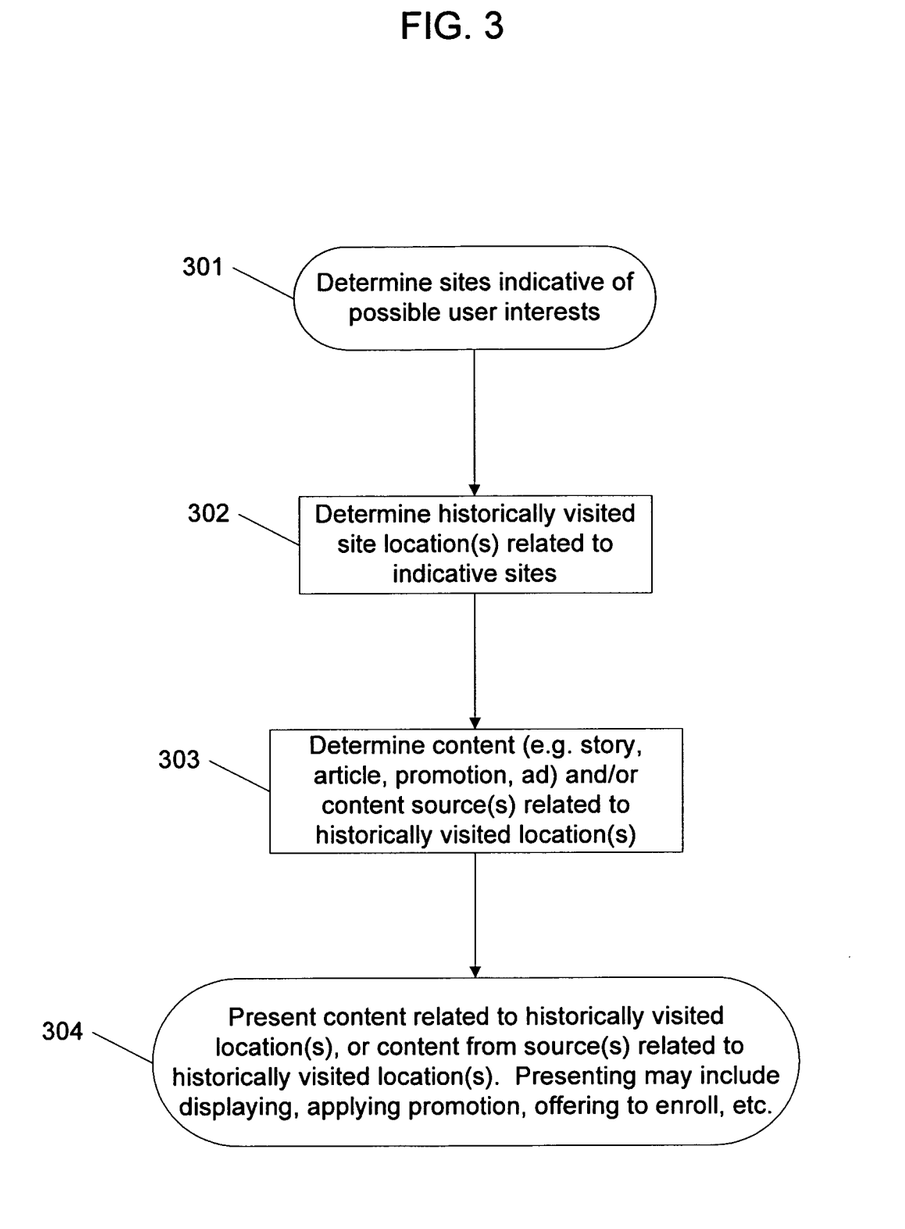
FIG. 3 is a flow diagram of a method for enrollment and/or content selection, according to some embodiments.

FIG. 3 is a flow diagram of a method for enrollment and/or content selection, according to some embodiments. In this example, one or more sites indicative of possible user interests may be determined (301). An example of determining sites indicative of possible user interests is to designate a predetermined set of URLs, wherein a URL is associated with a site related to one or more interests related to the site. In one example, a site such as www.nytimes.com may be associated with a content source such as a New York Times headline news feed, and/or an interest in content sources reflecting an imputed interest, such as news feeds in general. In another example, a site indicative of possible user interest may be associated with more specific content, such as a reference to a particular item and/or area of content. In another example, a site may be associated with one or more keywords. In another example, a site may be associated with a promotion, such as an offer for a discount or enrollment in an affiliate program, or a loyalty program such as a frequent flyer miles program. In another example, a site may be associated with an advertisement, for example an advertisement that may be displayed to visitors who have previously visited the site.

One or more historically visited site locations related to indicative site(s) may be determined (302). An example of determining a historically visited site location related to an indicative site is discussed in conjunction with FIG. 4.

Content and/or one or more content sources associated with historically visited site(s) may be determined (303).

An example of determining content associated with a historically visited site is to determine content from a site or feed associated with a historically visited site, for example a New York Times headline news feed associated with www.nytimes.com. Another example of determining content associated with a historically visited site is to determine content extrapolated to be of interest based on one or more previously visited sites, for example by a recommendation engine such as a collaborative filtering engine or by performing cluster analysis and presenting content within the same cluster as historically visited site(s).

In some embodiments, selection of content may include other criteria. One example of a criterion for selection of content is the popularity (209 of FIG. 2) of content, for example the global popularity of content and/or the popularity of content among an affinity group associated with the user (210 of FIG. 2). One example of an affinity group is a group explicitly joined by the user, such as a web of trust of friends. Another example of an affinity group is a group analytically determined to be associated with the user, for example by analysis of the user's interests and correlation with the interests of others. An example of popularity of content among an affinity group is a count of one or more readings and/or endorsements of the content among member(s) of the affinity group. Another example of popularity of content among an affinity group is one or more interests associated with the content, for example in the form of keywords or tags, that have been selected by member(s) of the affinity group. An example of selecting content using such criteria is to score content items based on such factors, for example in which timeliness is used as an exponential decay factor (for example, with a half-life of one day), endorsements count as a point, and endorsements from socially affine users count as an additional point, and selecting the highest-scoring related content item(s).

Another example of a criterion for selection of content is content associated with a feed to which a user has subscribed. For example, content may be selected from among articles associated with feeds to which a user has subscribed, based on specific articles a user is determined to have read outside a feed reading environment. In various embodiments, such article reading may be performed independently or in combination with a determination of user activity and/or preferences associated with articles read using a feed reader.

In some embodiments, determining content associated with historically visited site(s) may include mapping interests, for example as discussed in conjunction with interest mapper 205 of FIG. 2. An example of mapping interests is to select one or more keywords based on historically visited site(s), for example by looking up the sites in a hash table, database, or other dictionary data structure and retrieving keyword(s). In some embodiments, multiple interests may be deduced, and one may be selected, for example the strongest, or randomly selected, with a probability related to the strength of an interest. An example of determining a strength associated with an interest is to determine a number of sites or URLs associated with the interest that a user has previously visited, and using such number as a strength metric. In some embodiments, such keywords may subsequently be used to target content, such as one or more advertisements and/or promotions. An example of such targeting is using an interest as a category or keyword to an advertising server for targeted advertising, for example using a mechanism such as GoogleKW keyword(s) in Google's Ad Sense.

In some embodiments, determining content associated with historically visited site(s) may include determining a promotion associated with a site. An example of determining a promotion associated with the site is to look up the site in a mapping such as active promotions 207 of FIG. 2 and determine a promotion associated with the site. Examples of a promotion include a discount, an affiliate program, and a loyalty program such as an airline frequent flyer program. In some embodiments, a promotion may be offered. In some embodiments, a promotion may be automatically applied.

An example of determining a content source associated with a historically visited site is to determine a content feed in a direct association with a historically visited site, for example a New York Times headline news feed associated with www.nytimes.com. Another example of determining a content feed associated with a historically visited site is to determine a class of content feeds associated with a historically visited site, for example news feeds associated with www.nytimes.com (which may in some embodiments include one or more news feeds unaffiliated with the New York Times).

In some embodiments, a user interface may be presented allowing the user to confirm and/or select from among feeds associated with historically visited site(s), for example by presenting one or more feeds and/or classes of feeds and allowing selection of feeds in which enrollment is desired, for example by presenting a checkbox next to a feed and enabling selection and/or deselection of the checkbox.

In some embodiments, additional feeds may be recommended and/or selected, for example feeds that are determined to be related to one or more feeds and/or classes of feeds associated with historically visited site(s). In some embodiments, such additional feeds may be recommended and/or selected using a recommendation engine such as a collaborative filtering engine.

Content determined to be related to historically visited location(s), or content from source(s) determined to be related to historically visited location(s), directly or indirectly, may be presented (304).

An example of presenting content from a source is to subscribe to a feed from the source, for example by adding the feed to a list of subscriptions, for example a list in OPML format or in a database, at a user device such as user device 101 of FIG. 1 and/or a subscription management server 105 of FIG. 1. In some embodiments, content associated with the feed(s) may be presented, for example by displaying in a content reader. Such subscription may in various embodiments be performed automatically, or may be preceded by presenting a user interface offering an option to subscribe.

An example of presenting content is to display the content (which may include a story from a syndicated content source, an article which may or may not have been syndicated, an advertisement, etc.) in a content reader, for example by providing it at a web site. Another example of presenting content is to present, apply or offer to apply a promotion, such as a discount, an affiliate program such as a cross-promotional offer, or a loyalty program such as an airline frequent flyer program.

Figure 4:
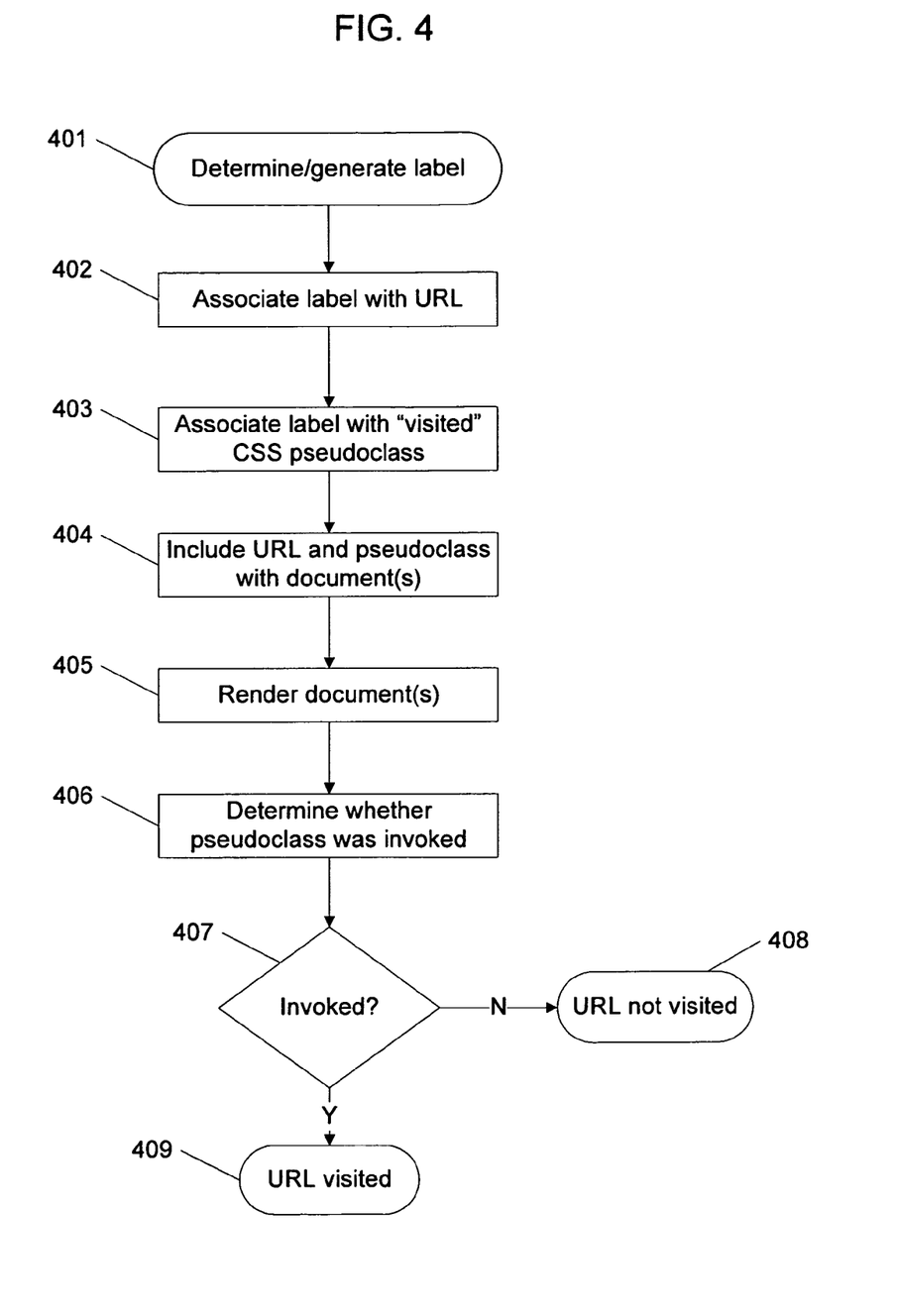
FIG. 4 is a flow diagram of a method for determining a historically visited site, according to some embodiments.

FIG. 4 is a flow diagram of a method for determining a historically visited site, according to some embodiments. An example of a historically visited site is a URL associated with a browser history. In this example, a label may be determined or generated (401). An example of determining a label is to use a predetermined label. Another example of generating a label is to use a label including a sequentially assigned component such as a successively incrementing counter.

The label may be associated with a URL (402). An example of associating the label with a URL is to associate the label with an "id" attribute, and associate the "id" attribute with the URL. For example, to associate the label "label1" with the URL www.nytimes.com, a tag may be created such as <a id="label1" href="http://www.nytimes.com"/></a>

In some embodiments, such a labeled URL may be associated with a <div> tag, wherein the <div> tag is associated with a class. For example, an enclosing <div> tag may be created such as

```
<div class="foo"><a id="label1"
    href="http://www.nytimes.com/"></a><div></div></
    div>
```

The class associated with the div may be modified by style information. For example, the following style information may be associated with a class associated with a URL, making it invisible and setting its positioning to absolute:

```
.foo {
    position: absolute;
    visibility: hidden;
}
```

The label may be associated with a pseudoclass associated with a previously visited URL (403). In some embodiments, a pseudoclass may be associated with a <style> tag and/or a cascading style sheet (CSS). An example of a pseudoclass associated with a previously visited URL is the "visited" pseudoclass. In some embodiments, a pseudoclass may include a reference to a server such as subscription management server 105 of FIG. 1. For example, the following "visited" pseudoclass may indicate to the server at https://www.subscriptions.com that the url labeled "label1", numbered "1" and associated with a session designated as "238746" has been visited:

```
#label1:visited {background:
url(https://www.subscriptions.com/
    ?url=1&session=238746);}
```

In some embodiments (not shown), a cookie may be used instead of or in addition to a session designation.

In some embodiments, a pseudoclass may set a property in a document object model (DOM) indicating that the URL has been visited. Examples of such properties include color, location and height, which may for example be indicated respectively (using different specific forms of style directives for illustrative purposes) as follows:

```
a:visited {color: red;}
#label1:visited {top: 100px;}
a {display: block; height: 30px;}
:visited {height: 100px;}
```

In some embodiments, such as setting the color or height as illustrated above, the association between the label and the pseudoclass may be implicit, e.g. a single rule may suffice for multiple labels.

The URL with associated label and the pseudoclass may be included in one or more documents (404), such as HTML documents.

The document(s) may be rendered (405), for example by a browser at a user device such as user device 101 of FIG. 1.

It may be determined whether the pseudoclass was invoked for the URL (406). One example of determining whether the pseudoclass was invoked is to determine at a server whether a URL associated with the visitation, such as a URL associated with a background image in a visited pseudoclass, was requested. Another example of determining whether the pseudoclass was invoked is to determine whether a property associated with the URL, such as color, location or height, has been set in a manner consistent with the pseudoclass having been invoked. An example of determining such a property is to check with a script such as a Javascript, for example by querying using the document.getElementById method and comparing the value to the value expected. As examples of such a query, a top position of a labeled element of a document may be obtained using document.getElementById('label1').offsetTop or document.getElementById('label1').nextSibling.offsetTop (which may for example be used in implementations respectively without and with use of an enclosing <div> tag, as shown above).

If it is determined that the pseudoclass was not invoked (407), then in this example it is determined that the URL was not historically visited (408). If it is determined that the pseudo class was invoked (407), then in this example it is determined that the URL was historically visited (409).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for selecting a promotion, comprising:
   specifying a predetermined URL;
   detecting whether the predetermined URL has previously been visited, wherein detecting whether the URL has previously been visited includes setting style information applicable to a link, wherein the link is associated with the predetermined URL;
   determining a promotion, wherein the promotion is associated with the URL, when it is detected that the predetermined URL has previously been visited; and
   selecting the promotion.

2. The method of claim 1, wherein setting style information applicable to the link includes defining a "visited" pseudoclass.

3. The method of claim 1, wherein detecting whether the predetermined URL has previously been visited includes determining an attribute associated with a link, wherein the link is associated with the predetermined URL.

4. The method of claim 1, wherein detecting whether the predetermined URL has previously been visited includes receiving a request at a server, wherein the request is associated with the style information.

5. The method of claim 1, wherein determining the promotion includes mapping the predetermined URL to the promotion.

6. The method of claim 1, wherein determining the promotion includes mapping the predetermined URL to an interest.

7. The method of claim 6, further comprising mapping the interest to the promotion.

8. The method of claim 1, wherein the promotion is associated with a discount.

9. The method of claim 1, wherein the promotion is associated with an affiliate program.

10. The method of claim 1, wherein the promotion is associated with an loyalty program.

11. The method of claim 1, further comprising displaying the promotion.

12. The method of claim 1, further comprising applying the promotion.

13. A system for selecting a promotion, comprising:
   a processor configured to:
      specify a predetermined URL;
      detect whether the predetermined URL has previously been visited, wherein detecting whether the URL has previously been visited includes setting style information applicable to a link, wherein the link is associated with the predetermined URL;
      determine a promotion, wherein the promotion is associated with the URL, when it is detected that the predetermined URL has been visited; and
      select the promotion; and
   a memory coupled with the processor, wherein the memory provides instructions to the processor.

14. The system of claim 13, wherein the promotion is related to a discount.

15. The system of claim 13, wherein detecting whether the predetermined URL has previously been visited includes determining an attribute associated with a link, wherein the link is associated with the predetermined URL.

16. The system of claim 13, further comprising displaying the promotion.

17. The system of claim 13, further comprising applying the promotion.

18. A computer program product for selecting a promotion, the computer program product being embodied in a non-transitory computer readable storage medium and comprising computer instructions for:
   specifying a predetermined URL;
   detecting whether the predetermined URL has previously been visited, wherein detecting whether the URL has previously been visited includes setting style information applicable to a link, wherein the link is associated with the predetermined URL;
   determining a promotion, wherein the promotion is associated with the predetermined URL, then it is detected that the URL has been visited; and
   selecting the promotion.

19. The computer program product of claim 17, wherein the promotion is related to a discount.

* * * * *